US008654094B2

(12) United States Patent
Bae

(10) Patent No.: US 8,654,094 B2
(45) Date of Patent: *Feb. 18, 2014

(54) TOUCH LOCATION DETECTING PANEL HAVING A SIMPLE LAYER STRUCTURE

(75) Inventor: Sang-ho Bae, Seoul (KR)

(73) Assignee: MELFAS, Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/592,433

(22) Filed: Aug. 23, 2012

(65) Prior Publication Data

US 2013/0002588 A1     Jan. 3, 2013

Related U.S. Application Data

(63) Continuation of application No. 12/449,923, filed as application No. PCT/KR2007/002558 on May 25, 2007, now Pat. No. 8,274,488.

(30) Foreign Application Priority Data

Mar. 5, 2007 (KR) .................. 10-2007-0021332

(51) Int. Cl.
    *G06F 3/041*     (2006.01)
    *G09G 5/00*     (2006.01)

(52) U.S. Cl.
    USPC .......................................... 345/173; 345/156

(58) Field of Classification Search
    USPC .................. 345/156–184; 178/18.01–20.04
    See application file for complete search history.

(56) References Cited

U.S. PATENT DOCUMENTS

| 4,484,026 | A | 11/1984 | Thornburg |
| 6,081,259 | A | 6/2000 | Teterwak |
| 7,522,230 | B2 * | 4/2009 | Lee .................................. 349/58 |
| 7,663,607 | B2 | 2/2010 | Hotelling et al. |
| 7,973,771 | B2 | 7/2011 | Geaghan |
| 8,274,488 | B2 * | 9/2012 | Bae ............................... 345/173 |
| 2003/0103043 | A1 | 6/2003 | Mulligan et al. |
| 2004/0263492 | A1 | 12/2004 | Chao et al. |
| 2006/0038754 | A1 | 2/2006 | Kim |
| 2006/0097991 | A1 * | 5/2006 | Hotelling et al. ............. 345/173 |
| 2006/0132454 | A1 | 6/2006 | Chen et al. |
| 2006/0232600 | A1 | 10/2006 | Kimura et al. |
| 2007/0008299 | A1 * | 1/2007 | Hristov ......................... 345/173 |
| 2007/0257894 | A1 | 11/2007 | Phillip |
| 2007/0279395 | A1 | 12/2007 | Phillip et al. |

(Continued)

FOREIGN PATENT DOCUMENTS

| JP | 1996-045381 | 2/1996 |
| JP | 2002-342034 | 11/2002 |
| JP | 2007-018515 | 1/2007 |

*Primary Examiner* — Alexander Eisen
*Assistant Examiner* — Patrick F Marinelli
(74) *Attorney, Agent, or Firm* — McKenna, Long & Aldridge, LLP.

(57) ABSTRACT

The present invention relates to a touch location detecting panel and, more particularly, to a touch location panel having a plurality of sensing areas arranged two-dimensionally. The touch location detecting panel of the invention has on a surface at one side of a single film a plurality of sensing areas arranged two-dimensionally. Each of the sensing areas includes a plurality of partitioned areas electrically isolated from each other, and the partitioned areas are respectively connected to separate channels of a circuit for detecting a user's touch on each of the partitioned areas. Accordingly, durability and productivity of the touch location detecting panel can be improved by simplifying the panel structure.

12 Claims, 8 Drawing Sheets

(56) References Cited

U.S. PATENT DOCUMENTS

| | | |
|---|---|---|
| 2008/0158172 A1 | 7/2008 | Hotelling et al. |
| 2008/0246496 A1 | 10/2008 | Hristov et al. |
| 2008/0264699 A1 | 10/2008 | Chang et al. |
| 2010/0123670 A1 | 5/2010 | Phillip |
| 2010/0245283 A1 | 9/2010 | Lee et al. |
| 2010/0258360 A1 | 10/2010 | Yilmaz |
| 2010/0289774 A1 | 11/2010 | Pan et al. |
| 2011/0048813 A1 | 3/2011 | Yilmaz |

* cited by examiner

TOUCH LOCATION DETECTING PANEL HAVING A SIMPLE LAYER STRUCTURE

This application is a continuation of application Ser. No. 12/449,923, filed Sep. 3, 2009, now U.S. Pat. No. 8,274,488, which is the national phase filing of the corresponding international application number PCT/KR2007/002558, filed on May 25, 2007, which claims priority to Korean application number 10-2007-0021332, filed Mar. 5, 2007, which applications are hereby incorporated by reference in their entirety for all purposes as if fully set forth herein.

TECHNICAL FIELD

The present invention relates to a touch location detecting panel applicable to a touch location detecting device such as a touch pad or a touchscreen.

BACKGROUND ART

A touch location detecting device is a device for detecting a user's touch at a specific location on a panel that is installed overlappingly on a display screen or provided separately from the display screen. Information on the presence and location of a touch on the panel are utilized for the operation control, screen manipulation and the like of a computer system that incorporates therein the touch location detecting device.

A method for detecting a touch location can be largely classified into two categories: a continuous location detecting type and a discrete location detecting type. The continuous location detecting method or an analog method measures a continuous change in, such as, optical or electrical characteristics caused by a change in user's touch location on a panel, and calculates the touch location based on the measured value. On the other hand, the discrete location detecting method, a so-called matrix type method, detects the presence of a user's touch on each of the sensing areas that are arranged at a plurality of locations on a panel to thereby find out the touch location.

While the continuous location detecting method is capable of detecting the touch location in a precise and elaborate manner, it requires a separate process or additional hardware for the calculation of the touch location. Meanwhile, the discrete location detecting method has a limited touch location detecting resolution which is dependent on an arrangement pitch of sensing areas. However, the discrete location detecting type method has been widely used in various kinds of digital equipments due to its easiness in acquiring information on a touch location, which is done simply by detecting a touch on a specific sensing area.

The present invention relates to a touch location detecting panel for use in a touch location detecting device adopting the discrete location detecting type method set forth above. FIGS. 1 and 2 illustrate sensing area patterns that constitute a touch location detecting panel of a conventional discrete location detecting type, and a layered structure thereof, respectively.

Referring to FIG. 1, the conventional touch location detecting panel is comprised of a total of 3 layers: a vertical location sensing layer 10 for sensing a vertical location of a user's touch; a horizontal location sensing layer 20 for sensing a horizontal location of the user's touch; and a shielding layer 30 for shielding the vertical and horizontal location sensing layers 10 and 20 from electrical noises. These three layers 10, 20 and 30 are layered through adhesive layers 23 and 33 as shown in FIG. 2, and as a whole, they are adhered to the rear surface of a transparent window 40 through an adhesive layer 13.

The three layers 10, 20 and 30 mentioned above are constituted by a film layer 11, 21, and 31 as a base of pattern formation, and a pattern layer 12, 22, and 32 formed thereon, respectively, as shown in FIG. 2.

In the conventional touch location detecting device, the reason that the horizontal location sensing layer 20 and the vertical location sensing layer 10 are configured in separate layers is to minimize the number of connection lines connected to an external circuitry for detecting a touch at each location. For example, if sensing areas are arranged at an M-number of locations in a horizontal direction and at an N-number of locations in a vertical direction on the surface of a single film, a touch detecting circuit would require an (M×N)-number of channels for detecting a touch on each sensing area. However, if sensing patterns for sensing vertical and horizontal locations, respectively, are formed separately in different sensing layers 10 and 20 as depicted in FIGS. 1 and 2, only an (M+N)-number of channels are needed to detect a touch location with respect to an entire panel area.

Namely, the conventional touch location detecting panel shown in FIGS. 1 and 2 is configured in a manner that the vertical location sensing layer 10 and the horizontal location sensing layer 20 are layered separately in order to avoid the limit on the number of sensing areas by the number of channels in the touch detecting circuit.

In this case, however, the lamination thickness of the touch location detecting panel increases, and manufacturing cost of the detecting panel is increased accordingly. For instance, in case of a touchscreen, the pattern layers 12, 22, and 32 are formed by using transparent conductive materials such as ITO (Indium Tin Oxide). Unfortunately, however, the formation of the ITO pattern layers requires a costly process, and since the conventional touch location detecting panel has even two sensing layers 10 and 20 having such high manufacturing costs, total manufacturing cost is increased.

To solve the above-mentioned problems, there arises a need for a new technique capable of minimizing the number of channels connected to the touch detecting circuit while allowing an arrangement of a vertical and a horizontal location sensing pattern together on the surface of a single film.

DISCLOSURE OF INVENTION

Technical Problem

It is, therefore, an object of the present invention to provide a touch location detecting panel which has a simple layer structure and requires low manufacturing costs.

Another object of the present invention is to provide a touch location detecting panel which is able to avoid a reduced productivity caused by an increased number of connectors and complicate wiring by utilizing a limited number of channels of a touch detecting circuit in an economical way.

Technical Solution

In accordance with one aspect of the present invention, there is provided a touch location detecting panel that includes a plurality of sensing areas arranged two-dimensionally on one side surface of a single film, wherein each of the sensing areas includes a plurality of partitioned areas electrically isolated from one another, and the partitioned areas are respectively connected to separate channels of a touch detecting circuit for detecting a user's touch on each of the partitioned areas.

In accordance with another aspect of the present invention, there is provided a touchscreen panel for detecting a location of a user's touch on a display screen that includes a transparent film; and a sensing pattern having a plurality of sensing areas arranged two-dimensionally on one side surface of the transparent film, wherein each of the sensing areas includes a plurality of partitioned areas electrically separated from one another, and among the plurality of partitioned areas, a first partitioned area is connected to a circuit for detecting a horizontal location of the user's touch, and a second partitioned area is connected to a circuit for detecting a vertical location of the user's touch.

The touch location detecting panel in accordance with the above-mentioned aspects of the present invention may be a panel constituting a touch pad or a touchscreen, and may utilize a change in electrical characteristics, pressure or heat conducting characteristics according to a user's touch for detecting the user's touch on each sensing area. While a capacitive type touchscreen panel is incorporated as a representative embodiment hereinafter, the scope of the present invention is not limited by a specific technical principle employed in touch detection or a type of a digital equipment where the touch location detecting panel is applied.

BRIEF DESCRIPTION OF THE DRAWINGS

The above and other objects and features of the present invention will become apparent from the following description of embodiments given in conjunction with the accompanying drawings, in which.

BEST MODE FOR CARRYING OUT THE INVENTION

Figure 1:
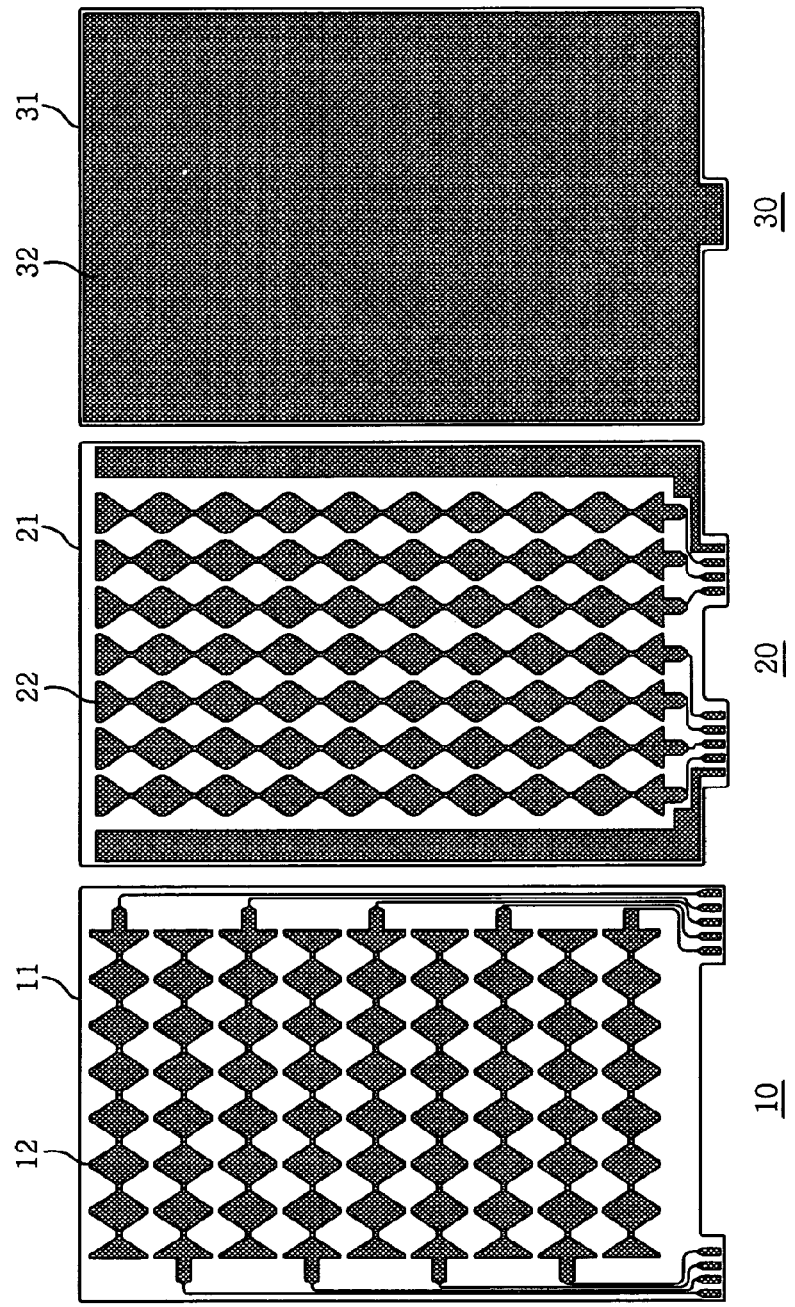
FIG. 1 shows patterns of each layer constituting a conventional capacitive type touchscreen panel.
Figure 2:
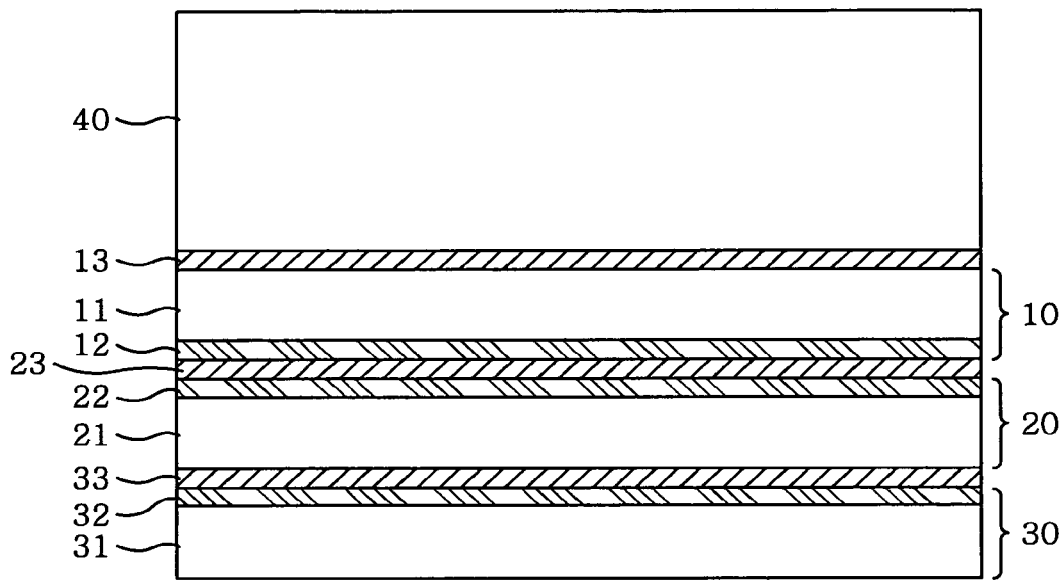
FIG. 2 illustrates a layered structure of the touchscreen panel shown in FIG. 1.

Hereinafter, a touch location detecting panel in accordance with the present invention will be described in detail with reference to the accompanying drawings. In the following description, the same reference numerals are denoted for the same components or members given in different drawings unless there is a particular description therefor.

Figure 3:
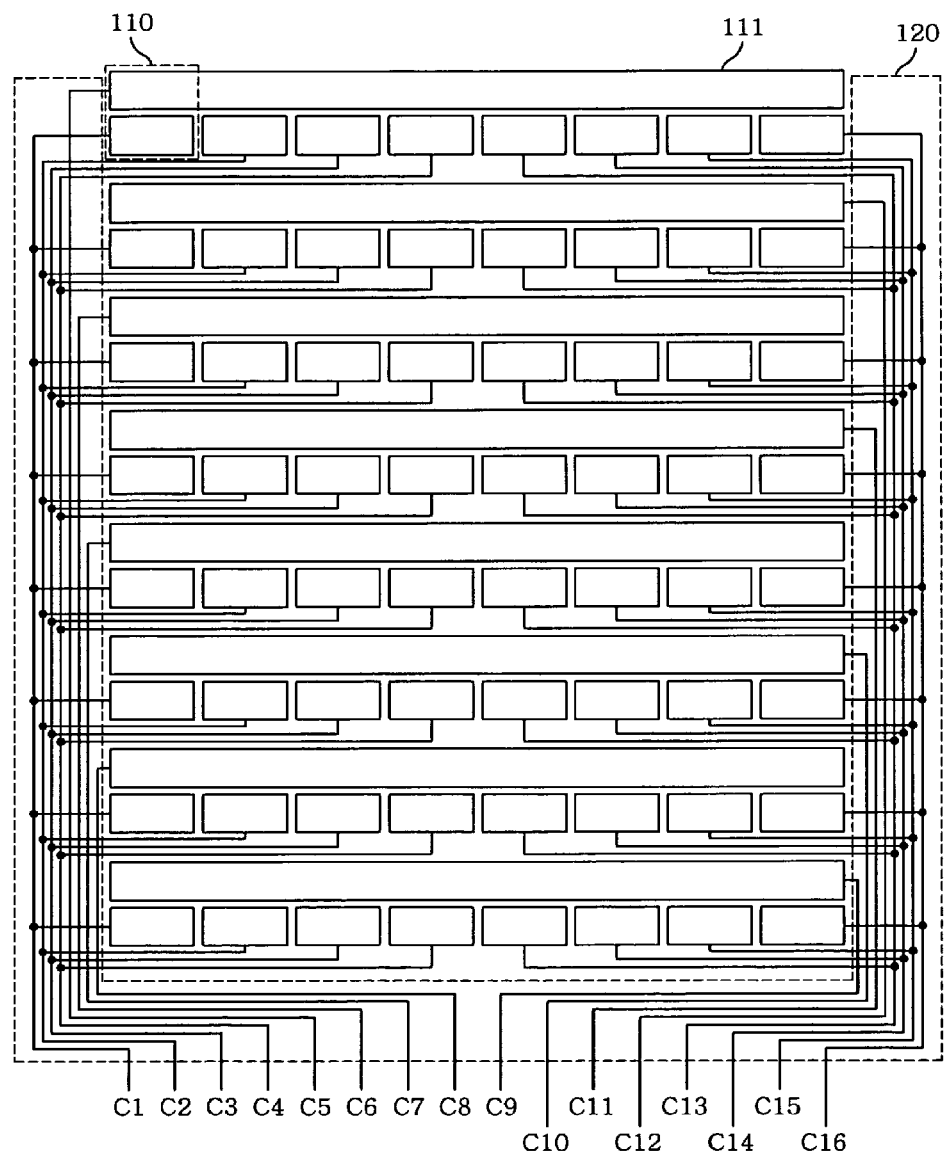
FIG. 3 presents a sensing area arrangement and an electrical connection relationship among sensing areas of a touch location detecting panel in accordance with an embodiment of the present invention.
Figure 4:
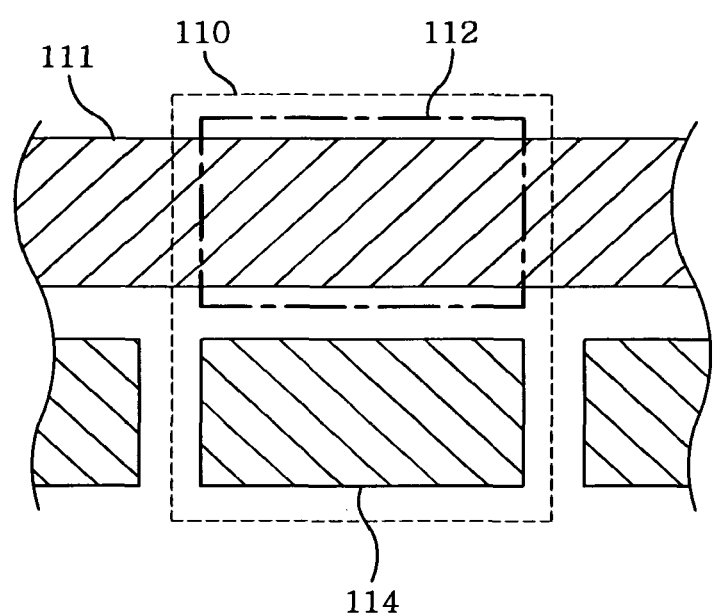
FIG. 4 offers an enlarged view of the sensing area depicted in FIG. 3.

FIG. 3 illustrates a sensing pattern for detecting a location of a touch on a touch location detecting panel in accordance with a preferred embodiment of the present invention, and FIG. 4 is an enlarged view of a sensing area 110 shown in FIG. 3.

Referring to FIG. 3, the sensing pattern includes vertical location sensing bars 111 extended in a horizontal direction at a plurality of vertical locations, and horizontal location sensing areas 114 that are arranged at a plurality of horizontal locations in a row adjacently to each of the vertical location sensing bars 111.

In case of a touch location detecting panel of a capacitive type, the vertical location sensing bars 111 and the horizontal location sensing areas 114 are made of a conductive material. Particularly, in case of a touchscreen panel, the vertical location sensing bars 111 and the horizontal location sensing areas 114 are made of a transparent conductive material such as ITO. A connection line pattern 120 rimmed by dotted lines in FIG. 3 may be formed directly on a film where the sensing area 110 is formed, or may be configured by adhering a flexible PCB or a rigid PCB onto the film for the connection to an external touch detecting circuit.

The touch location detecting panel having the sensing pattern formed as in FIG. 3 includes eight (8) sensing areas 110 in a horizontal direction and eight (8) sensing areas 110 in a vertical direction. As illustrated in FIG. 4, each sensing area 110 has a horizontal location sensing area 114 included therein, and a vertical location sensing area 112 that is a portion of the vertical location sensing bar 111 and is included in the sensing area 110. The horizontal location sensing area 114 and the vertical location sensing area 112 are respectively used to extract a horizontal location component and a vertical location component of a touch location. For convenience, these are referred to as a first partitioned area and a second partitioned area, or a first partitioned electrode and a second partitioned electrode, respectively.

The first partitioned area 114 and the second partitioned area 112 are electrically isolated from each other, and are connected to a touch detecting circuit (not shown) through separate channels, respectively. The touch detecting circuit can detect a user's touch on a specific sensing area 110 based on a change in electric capacitance caused by the touch thereon. The bottom part of FIG. 3 shows connection lines, each being connected to a corresponding one of 16 channels of the touch detecting circuit.

As shown in FIG. 3, different vertical location sensing bars 111 are respectively connected to different channels from one another, and horizontal location sensing areas 114 arranged at different horizontal locations are respectively connected to different channels from one another. Namely, respective first partitioned areas 114 that belong to different horizontal location sensing areas 110 and that are arranged at the same horizontal location are electrically connected to one another, and respective second partitioned areas 112 arranged at the same vertical location are electrically connected to one another. The set of first or second partitioned areas 114 or 112 electrically interconnected is separated from other sets of first or second partitioned areas 114 or 112 that are not electrically connected to one another. Theses multiple sets of the electrically interconnected first or second partitioned areas 114 or 112 are connected to the touch detecting circuit through separate channels, thereby individually detecting a touch thereon.

It is first assumed that the first partitioned areas 114 and the second partitioned areas 112 are connected as shown in FIG. 3. Under the assumption, if a touch is applied on the sensing area 110 aligned first from the left and first from the top, the touch detecting circuit extracts information on a horizontal and a vertical location of the touch through channels C1 and C5, respectively. Similarly, if a touch is detected through channels C12 and C15, the touch detecting circuit can detect that a user's touch has occurred on the location sensing area 110 aligned seventh from the left and second from the top.

A touch location includes a horizontal location and a vertical location. Information about the horizontal location and the vertical location is extracted through channels connected to the first partitioned area 114 and the second partitioned area 112 included in the sensing area 110 that corresponds to the touch location. Therefore, for a successful detection of a user's touch location through the touch location detecting panel according to the embodiment of the present invention, it should be guaranteed that the touch is detected through one or more channels which are connected to one or more first partitioned areas 114 and one or more channels that are connected to one or more second partitioned areas 112. Thus, it is preferred that the first and the second partitioned areas 114 and 112 are formed smaller in size than a minimum touch area of a touching object (e.g., a user's finger).

The touch area used herein does not necessarily indicate an area on a touch surface making a physical contact, but may also be interpreted as an area of the touching object's portion that approaches to the touch surface within a distance close enough to be detected as touching on the first and the second partitioned areas 114 and 112. That is, although a central portion of a flexible touching object contacts with the touch surface while its edge portion is away from the touch surface at a certain distance, if the distance falls within a range that can be recognized as a touch by the touch detecting circuit, even the edge portion is included in the touch area.

In case where a touch is detected through channels that correspond to a plurality of horizontal or vertical locations (which is referred to as a first exceptional situation), information on the horizontal or vertical locations can be utilized for more precise calculation for a touch location. For example, if a touch is detected through channels C1 and C2 at the same time, the touch location detecting circuit averages horizontal locations each corresponding to the channels C1 and C2, and acquires a horizontal location represented by the average value as a horizontal location component for the location of the touch. In this case, the resolution for discriminating the horizontal location is doubled.

Besides, even when a touch is detected through channels each corresponding to a single horizontal location and a single vertical location, but the first and the second partitioned area 114 and 112 connected to these channels do not belong to the same sensing area 110 (which is referred to as a second exceptional situation), such information may be utilized for more precise calculation for a touch location. For instance, a touch detected simultaneously through channels C1 and C12 indicates that the touch has been detected on the first partitioned area 114 belonging to the sensing area 110 aligned first from the left and first from the top, and on the second partitioned area 112 belonging to the sensing area 110 aligned first from the left and second from the top. In this case, the touch location detecting circuit may determine the horizontal location that is aligned first from the left as the horizontal location component, and a vertical location between the first and the second from the top as the vertical location component. Therefore, the resolution for discriminating the vertical location is doubled.

Furthermore, a proper use of the information about channels where a touch is detected during the first and the second exceptional situations can increase two times or more the resolution for discriminating a horizontal or vertical location of the touch.

Meanwhile, it is preferred that the sensing pattern is formed such that the first partitioned area 114 and the second partitioned area 112 have substantially the same area. Having substantially the same area means that the areas are maintained at similar dimensions within a range that does not significantly affect touch detection on each of the partitioned areas 112 and 114. If there is an excessively large area difference between the first partitioned area 114 and the second partitioned area 112, sensitivity of detecting a touch on the first partitioned area 114 and the second partitioned area 112 may greatly vary from each other. In this case, the device may fail to acquire information on one of the horizontal location and the vertical location even when a touch is achieved normally.

Figure 5:
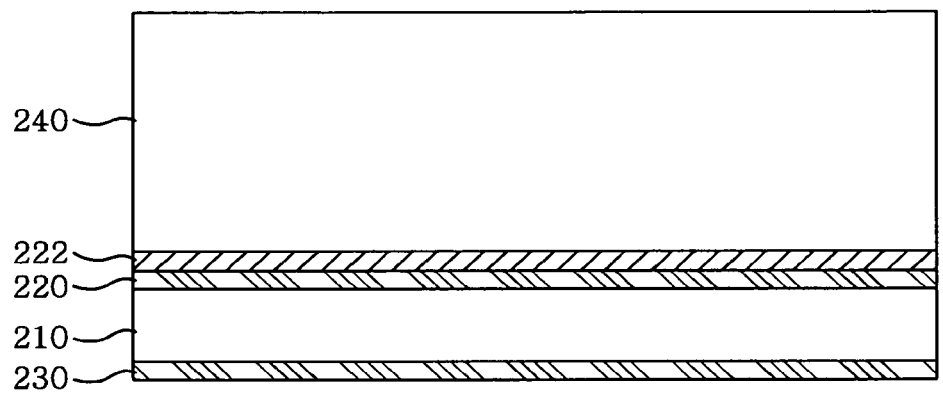
FIGS. 5 and 6 illustrate two examples of a layered structure of the touch location detecting panel in FIG. 3.
Figure 6:
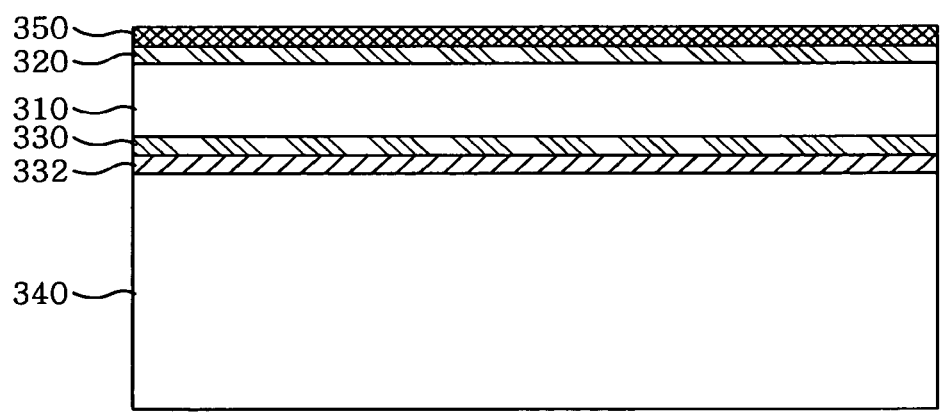

FIGS. 5 and 6 show layered structures of the touch location detecting panel whose planar structure is shown in FIGS. 3 and 4. In particular, FIGS. 5 and 6 illustrate two different layered structures both applicable to the current embodiment, respectively.

As illustrated in FIGS. 5 and 6, the sensing pattern as shown in FIG. 3 is disposed in a sensing area pattern layer 220 or 320 that is formed on one side surface of a single film 210 or 310. That is, the vertical location sensing bars 111 and the horizontal location sensing areas 114 are formed together in the sensing area pattern layer 220 or 320. When applied to a touchscreen, the single film 210 or 310 is a transparent film, and the sensing area pattern layer 220 or 320 as well as a shielding layer 230 or 330 is made of a transparent conductive material such as ITO and the like.

The shielding layer 230 or 330 is arranged on the opposite side surface of the film 210 or 310 as shown in FIGS. 5 and 6, respectively. The touch location detecting panel is installed, by its nature, on the outermost surface of a digital equipment to allow a touch of a user. Thus, it is electrically influenced by, for example, an internal circuit of the digital equipment. In case of a touch pad panel, electrical noises may be introduced from an electric circuit arranged at the rear side of the panel, and in case of a touchscreen panel, electrical noises may be introduced from an electric circuit and a display device arranged at the rear side of the panel. The shielding layer 230 or 330 serves to shield such touch location detecting panels from those electrical noises. With help of the shielding layer 230 or 330, malfunctions that may be caused by electrical noises are prevented, thereby improving performance of the touch location detecting panel.

In FIG. 5, the single film 210 having the sensing area pattern layer 220 formed on one side surface thereof and the shielding layer 230 formed on the other side surface thereof is attached to a window panel 240 by an adhesive layer 222. The window panel 240 functions to be a touch surface of a user and a substrate for sustaining the single film 210. For normal operation of the touch location detecting panel of a capacitive type, it is preferred that the window panel 240 is made of a material having a uniform dielectric constant and a uniform thickness.

Meanwhile, in FIG. 6, the single film 310 is shown to have the sensing area pattern layer 320 formed on one side surface thereof and the shielding layer 330 on the other side surface thereof is attached to the front side surface of the window panel 340 through an adhesive layer 332. Over the front side surface of the single film 310 is provided a protective layer 350. Unlike the window panel 240 depicted in FIG. 5, the window panel 340 in FIG. 6 functions to be a substrate supporting the single film 310 while the protective layer 350 functions to be a touch surface of a user. The protective layer 350 is made of a material that can protect the single film 310 from mechanical and/or chemical damages. In case of a touchscreen panel, a highly transparent material is used for the protective layer. Preferably, the protective layer 350 is made of a material having a uniform dielectric constant and a uniform thickness.

The layered structures shown in FIGS. 5 and 6 may be selectively applied, considering the shape of the housing or the like of digital equipment in which the touch location detecting panel is installed.

As explained earlier, FIGS. 5 and 6 illustrate cases where the sensing area pattern layer 220 or 320 and the shielding layer 230 or 330 are respectively formed on both surfaces of the single film 210 or 310, with a conductive material. However, it is not necessarily required to form the shielding layer 230 or 330 on the other side surface of the single film 210 or 310. Instead, the shielding layer 230 or 330 may be formed on separate film different from the film 210 or 310. In this case, the film 210 or 310 having the sensing area pattern layer 220 or 320 formed on one side surface thereof may be laminated, through an adhesive layer, over the front side surface of another film on which the shielding layer is formed.

For reference, if the electrical noise is not severe, the shielding layer 230 or 330 may be omitted for a simple layered structure. The adhesive layer 222 or 332 may not be used as well in a situation where it is unnecessary.

FIGS. 7 to 11 show a variety of modified examples of the sensing patterns for the touch location detecting panel in FIG. 3.

Figure 7:
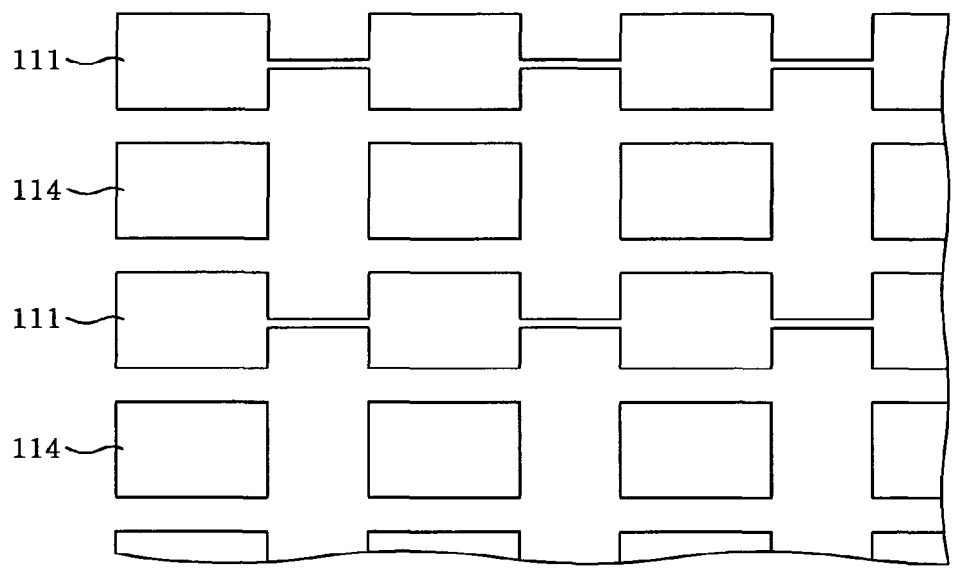
FIGS. 7 to 11 exemplify a variety of shapes and arrangements of partitioned areas that constitute the sensing area of the touch location detecting panel in accordance with the present invention.

In the sensing pattern shown in FIG. 7, an area of the portion that is not included in the sensing area 110 among the areas of the vertical location sensing bars 111 is minimized to thereby prevent from the generation of unnecessary parasitic capacitances.

Figure 8:
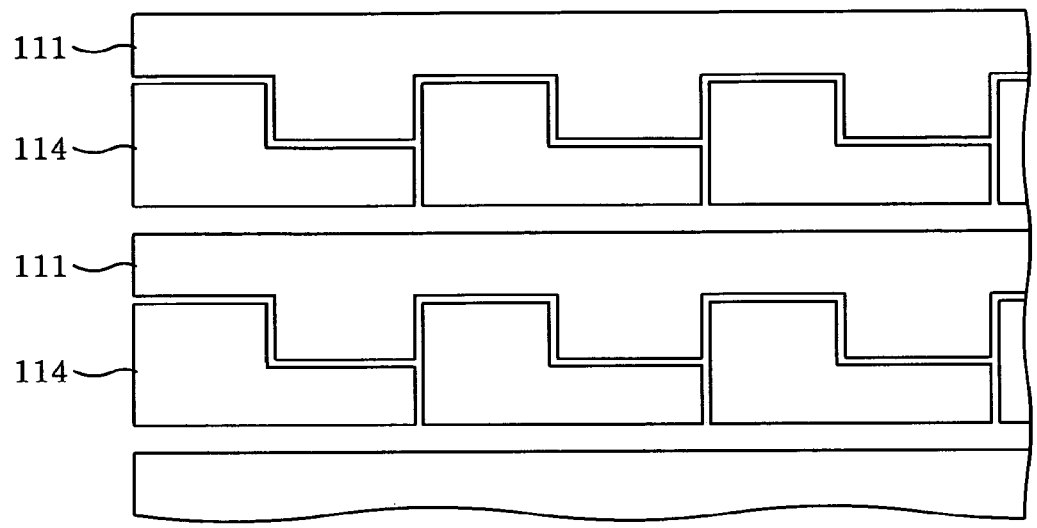
Figure 9:
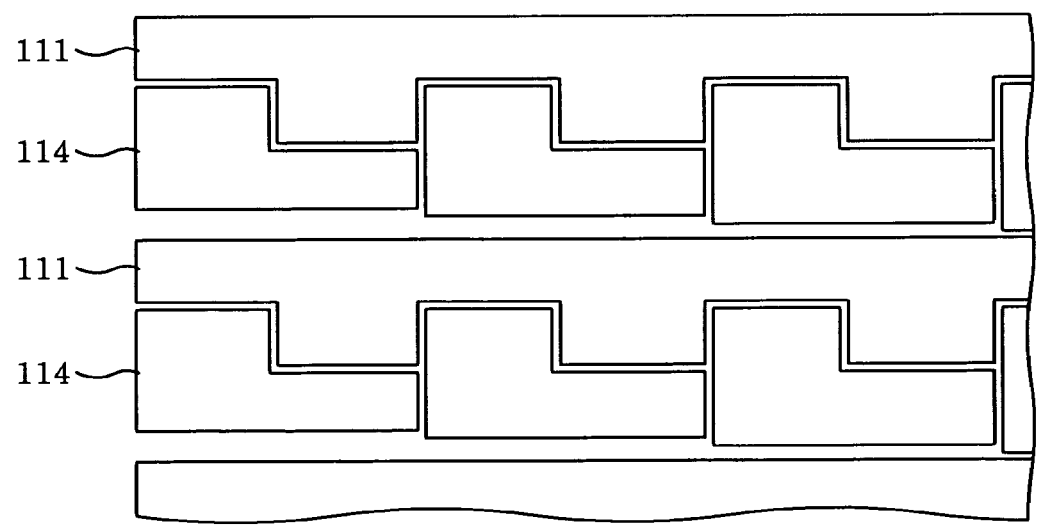

FIGS. 8 and 9 illustrate cases where the first partitioned areas 114 and the second partitioned areas 112 have an "L" shape, respectively. Whereas the first partitioned areas 114 in FIG. 8 are uniform in size, those in FIG. 9 slightly differ in size depending on the sensing areas 110. FIG. 9 presents a structure that can be selected for easy wiring while not influencing on the touch detecting performance for each of the first partitioned areas 114.

Figure 10:
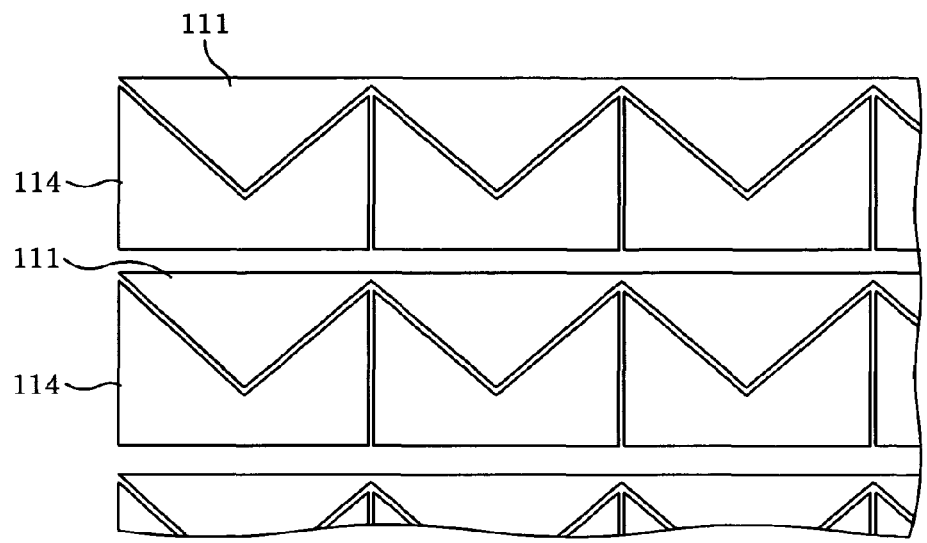
Figure 11:
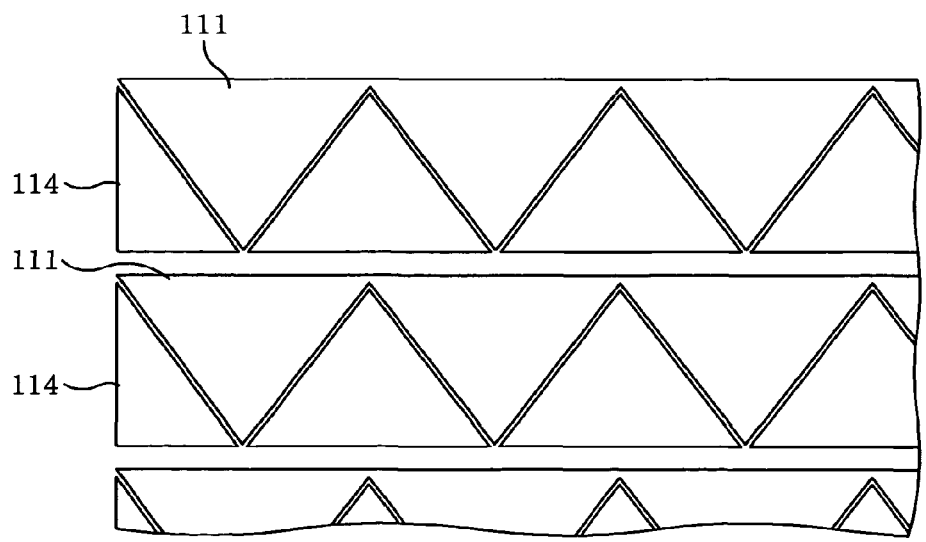

Meanwhile, FIG. 10 and FIG. 11 illustrate examples where the first partitioned areas 114 and the second partitioned areas 112 have a saw toothed shape, respectively.

In addition to the shapes shown in FIGS. 7 through 11, the partitioned areas 112 and 114 may be designed in appropriate shapes for purposes of facilitating manufacture and of improving performance of the touch location detecting panel. While doing this, as mentioned earlier, it is preferable to make the first partitioned areas 114 and the second partitioned areas 112 have substantially the same area, and to design each of the partitioned areas 112 and 114 to have smaller area than a minimum touch area of a touching object.

The sensing patterns depicted in FIGS. 3, 7 through 11 are all configured in a manner that the vertical location sensing bars 111 are extended in a horizontal direction, and the horizontal location sensing areas 114 are arranged at a plurality of horizontal locations adjacently to each of the vertical location sensing bars 111. Alternatively, however, the sensing patterns may be configured in a manner that the horizontal location sensing bars are extended in a vertical direction, and the vertical location sensing areas are arranged at a plurality of vertical locations adjacently to each of the horizontal location sensing bars.

Moreover, in addition to the configuration where the sensing areas 110 are arranged along two axes, a horizontal axis and a vertical axis, crossing at right angles, the sensing areas 110 may be arranged two-dimensionally along two axes intersecting each other at a certain angle, not being perpendicular to each other. For example, if the touch location detecting panel has a rhombus shape, each of the sensing areas 110 may be formed as a smaller rhombus-shaped area and arranged two-dimensionally side by side along two sides of the rhombus-shaped panel.

The touch location detecting panel in accordance with the present invention simplifies a layered structure by arranging both of the partitioned areas for respectively sensing horizontal locations and vertical locations on a surface of a single film, and thus can improve durability of the touch location detecting panel while reducing manufacturing costs.

In addition, compared with the conventional panels, the touch location detecting panel according to the present invention has a thinner layered structure, which makes it applicable to ultra-slim digital equipments.

Moreover, the total number of connection lines being connected to the touch detecting circuit is minimized, thereby efficiently utilizing the touch detecting circuit having a limited number of channels. Accordingly, the present invention can solve a problem that the number of sensing areas is restricted to the number of channels of the touch detecting circuit, and would also prevent from a reduced productivity caused by an increased number of connectors and complicate wiring due to an increased number of connection lines.

While the present invention has been described with respect to certain preferred embodiments, it will be apparent to those skilled in the art that various changes and modifications may be made without departing from the scope of the invention as defined in the following claims.

The invention claimed is:

1. A method for manufacturing a touch detecting panel having a touch detecting area, a wiring area outside the touch detecting area and a plurality of wirings having a first portion within the touch detecting area and a second portion in the wiring area, the method comprising:
   forming a conductive layer on a surface of a substrate;
   patterning the conductive layer to form together a plurality of sensing areas arranged two-dimensionally in a matrix greater than or equal to 3×3 to define the touch detecting area, wherein each of the plurality of sensing areas includes:
      a separate and distinct first partitioned electrode for detecting a first axis location of a touch; and
      a second partitioned electrode for detecting a second axis location of the touch, the second partitioned electrode being electrically separated from the first partitioned electrode,
   wherein first partitioned electrodes arrayed at the same position on the first axis are electrically connected to one another through the first portion and the second portion of the plurality of wirings, and
   wherein second partitioned electrodes arrayed at the same position on the second axis are contiguously connected to one another in the touch detecting area to form a sensing bar extended along the first axis direction; and
   electrically connecting each of the first partitioned electrodes and the second partitioned electrodes to a separate channel of a touch detecting circuit.

2. The method according to claim 1, further comprising a protective layer formed on the touch detecting area.

3. The method according to claim 1, further comprising forming a transparent window of a display device on the substrate.

4. The method according to claim 1, further comprising forming a shielding layer on an opposite surface of the substrate.

5. The method according to claim 1, wherein the sensing bar has at least two different thicknesses.

6. The method according to claim 5, wherein the first partitioned electrodes have at least one of a 'L' shape, a 'M' shape and a triangular shape.

7. The method according to claim 1, wherein the first and the second partitioned electrodes and the first portion of the plurality of wirings are on the same surface of the substrate.

8. The method according to claim 1, wherein the substrate is formed of a transparent material.

9. The method according to claim 1, wherein the first partitioned electrode and the second partitioned electrode are substantially identical in area.

10. The method according to claim 1, wherein the first axis and the second axis intersect perpendicularly to each other.

11. The method according to claim 1, wherein the touch detecting circuit which detects the touch based on change in electric capacitance caused by the touch.

12. The method according to claim 1, wherein the first partitioned electrodes and the second partitioned electrodes are formed of a transparent conductive material.

* * * * *